(12) United States Patent
Liu et al.

(10) Patent No.: US 9,488,525 B2
(45) Date of Patent: Nov. 8, 2016

(54) METHOD AND APPARATUS FOR FEMTOSECOND LASER PULSE MEASUREMENT BASED ON TRANSIENT-GRATING EFFECT

(71) Applicant: Shanghai Institute of Optics And Fine Mechanics, Chinese Academy of Sciences, Shanghai (CN)

(72) Inventors: Jun Liu, Shanghai (CN); Fangjia Li, Shanghai (CN); Ruxin Li, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 77 days.

(21) Appl. No.: 14/466,861

(22) Filed: Aug. 22, 2014

(65) Prior Publication Data

US 2014/0362376 A1    Dec. 11, 2014

Related U.S. Application Data

(63) Continuation-in-part of application No. PCT/CN2012/000873, filed on Jun. 25, 2012.

(30) Foreign Application Priority Data

Mar. 22, 2012 (CN) .......................... 2012 1 0079324

(51) Int. Cl.
*G01J 3/28* (2006.01)
*G01J 3/45* (2006.01)
(Continued)

(52) U.S. Cl.
CPC .. *G01J 3/45* (2013.01); *G01J 3/18* (2013.01); *G01J 11/00* (2013.01); *G02B 19/0095* (2013.01); *G02B 27/0988* (2013.01); *G01J 2003/1861* (2013.01); *G01J 2003/451* (2013.01)

(58) Field of Classification Search
CPC ...... G01J 11/00; G01J 3/45; G01J 2003/451; G01J 3/453; G01J 3/4531; G01J 2003/4538; G01J 3/18; G01J 2003/1861; G01J 3/0229; G02B 27/0988
See application file for complete search history.

(56) References Cited

U.S. PATENT DOCUMENTS 5,344,236 A * 9/1994 Fishman ................ G01N 25/72
356/237.5
5,734,470 A * 3/1998 Rogers ................. G01N 21/636
356/432

(Continued)

FOREIGN PATENT DOCUMENTS

CN    201110198352.9 A    1/2012

OTHER PUBLICATIONS

Boyd et al. / Nonlinear Optical Materials / 2001 / Elsevier Science Ltd / Encyclopedia: Science and Technology / pp. 1-8.*

(Continued)

*Primary Examiner* — Kara E Geisel
*Assistant Examiner* — Rufus Phillips
(74) *Attorney, Agent, or Firm* — Mei & Mark LLP; Manni Li

(57) ABSTRACT

Apparatuses and method for real-time measuring ultrashort pulse shape and pulse width. Transient-grating effect on a transparent optical medium is used to generate a reference beam. A black plate with four equal-sized holes divides the incoming laser beam into four beams, one of which is attenuated and introduced an appropriate time delay relative to the other three. The four laser beams pass through a concave mirror and are focused onto a nonlinear transparent optical medium. The three beams without attenuation are used to generate a transient-grating light in the transparent medium. The transient-grating light is collinear and overlapped with the fourth attenuated beam. According to the third-order nonlinear effect, the transient-grating light has a broader spectral bandwidth and more smooth spectrum phase with respect to the incident laser. By measuring the spectral interference, the spectrum and spectral phase may be retrieved by spectral interferometry.

4 Claims, 6 Drawing Sheets

(51) Int. Cl.
  *G01J 11/00* (2006.01)
  *G02B 19/00* (2006.01)
  *G02B 27/09* (2006.01)
  *G01J 3/18* (2006.01)

(56) References Cited

U.S. PATENT DOCUMENTS

| | | | | |
|---|---|---|---|---|
| 6,008,899 A * | 12/1999 | Trebino | ............... | G01J 11/00 250/550 |
| 6,075,235 A * | 6/2000 | Chun | ............... | G01J 4/04 250/208.1 |
| 6,734,976 B2 * | 5/2004 | Sun | ............... | G01J 11/00 356/450 |
| 8,823,848 B2 * | 9/2014 | Chipman | ............... | G01J 4/04 348/208.2 |
| 2009/0116009 A1 * | 5/2009 | Nelson | ............... | G01J 3/02 356/326 |
| 2015/0157246 A1 * | 6/2015 | Leszinske | ............... | G01N 21/21 600/316 |

OTHER PUBLICATIONS

R.Trebino, "Frequency-Resolved Optical Grating: The Measurement of Ultrashort Laser Pulses," Kluwer Academic Publishers, pp. 65-75 (2000).

R. Trebino et al., "Measuring ultrashort laser pulses in the time-frequency domain using frequency-resolved optical gating," Rev. Sci.Instrum.68 (9), 3277-3295 (1997).

C.Iaconis et al., "Spectral phase interferometry for direct electric-field reconstruction of ultrashort optical pulses," Opt.Lett. 23(10),792-794 (1998).

A. Jullien et al., "Spectral broadening and pulse duration reduction during cross-polarized wave generation: Influence of the quadratic spectral phase," Appl. Phys. B 87 (4), 595-601(2007).

T. Oksenhendler et al., "Self-referenced spectral interferometry," Appl.Phys.B 99 (1), 7-12 (2010).

J. Liu et al., "Self-referenced spectral interferometry based on self-diffraction effect," J. Opt. Soc. Am. B 29 (I): 29-34 (2012).

J. Liu et al., "Femtosecond pulses cleaning by transient-grating process in Kerr-optical media," Chin.Opt.Lett.9 (5): 051903 (2011).

* cited by examiner

METHOD AND APPARATUS FOR FEMTOSECOND LASER PULSE MEASUREMENT BASED ON TRANSIENT-GRATING EFFECT

CROSS-REFERENCE AND RELATED APPLICATIONS

The subject application is a continuation-in-part of PCT international application PCT/CN2012/000873 filed on Jun. 25, 2012, which in turn claims priority on Chinese patent application No. CN 201210079324.X filed on Mar. 22, 2012. The contents and subject matter of the PCT and Chinese priority applications are incorporated herein by reference.

TECHNICAL FIELD

The present invention relates to a femtosecond laser and method and apparatus for femtosecond laser pulse measurement based on transient-grating effect on a transparent medium, particularly, a self-referencing spectral interferometry method and apparatus for retrieving the spectral phase and pulse width that can be used to measure pulse in the 200-3000 nm spectral range. The present invention also relates to the application of the device for measuring megahertz repetition rate femtosecond laser pulses and single-shot femtosecond laser pulses.

BACKGROUND OF THE INVENTION

Femtosecond laser pulses had been applied broadly in various fields such as biological, medical, processing, communication, defense, and others. Femtosecond lasers and relative technologies have also been developed quickly. Recently, hot research fields, such as femtosecond chemistry, femtosecond nonlinear optical microscopy imaging of chemical and biological materials, are all based on femtosecond lasers. Attosecond laser pulse generation, X-ray laser, laboratory astrophysics, laser acceleration of electrons and protons, and other strong-field laser physics are all taking the advantage of femtosecond laser pulses as a research tool. In contrast to the nanosecond and picosecond lasers, femtosecond laser processing can get much more refined and smooth surface shape. Then it was widely used in the field of femtosecond laser micromachining. Femtosecond laser pulses has also recently been used for ophthalmic lens cutting operation, which greatly improves the quality and safety of the kind of surgery.

In the application of the laser, the pulse shape and the pulse width of the femtosecond laser pulse are important optical parameters. Real-time measurement or monitoring of these parameters are necessary in many experiments. Therefore, a simple, convenient, and effective method and apparatus for laser pulse measurement and real-time monitoring is important and promotes the development and application of femtosecond laser technology.

The technique for femtosecond laser pulse width measurement is evolving as the development of femtosecond laser technology. Currently, the most commonly used methods include autocorrelation method, See R. Trebino, *Frequency-Resolved Optical Grating: The Measurement of Ultrashort Laser Pulses*, Kluwer Academic Publishers (2000), frequency-resolved optical gating (FROG) method, See R. Trebino et al., "*Measuring ultrashort laser pulses in the time frequency domain using frequency-resolved optical gating,*" *Rev. Sci. Instrum.* 68 (9), 3277-3295 (1997), and spectral phase interferometry for direct electric-field reconstruction (SPIDER) method, See C. Iaconis et al., "*Spectral phase interferometry for direct electric-field reconstruction of ultrashort optical pulses,*" *Opt. Lett.* 23 (10), 792-794 (1998). Autocorrelation method is simple in the principles and structure but can not obtain the phase information of femtosecond laser pulses. FROG and SPIDER are used to get the pulse phase. However, FROG method usually need a long time to rebuild the pulse. SPIDER method usually requires a nonlinear optical crystal to convert the generated measurement signal. Because of the phase matching conditions in nonlinear optical crystals, each apparatus can only be adapted to a particular spectral range, thus limiting the application of the method in a wide spectrum range.

Recently, cross-polarized wave (XPW) generation, see A. Jullien et al., "*Spectral broadening and pulse duration reduction during cross polarized wave generation: influence of the quadratic spectral phase,*" *Appl. Phys. B* 87 (4), 595-601(2007), is used as a reference light for self-referenced spectral interferometry (SRSI) method, see T. Oksenhendler et al., "*Self-referenced spectral interferometry,*" *Appl. Phys. B* 99 (1), 7-12 (2010), to measure the femtosecond laser pulse. In this method, one incident beam is used without being divided into two beams. In the calculation, only three simple iterative calculations are needed to quickly obtain the spectra and spectral phase of the measured laser pulse, which is by far the most simple and convenient method. However, it requires the polarizer in the method. Then, the method is only valid for a particular wavelength, which also limits the application of the method and apparatus within a specific spectral range. The dispersion of the polarizer element also restricts the shortest pulse duration to be measured on 10 fs level. Recently, the self-diffraction effect based SRSI method has been used with the polarizer and relative restriction. In the method, the beam to be measured is divided into three beams. The current setup of the method is somewhat complex. See J. Liu et al., "*Self-referenced spectral interferometry based on self-diffraction effect,*" *J. Opt. Soc. Am. B* 29 (I): 29-34 (2012).

SUMMARY OF THE INVENTION

The present invention provides a method and apparatus based on the transient-grating effect on a transparent medium by using SRSI technique. The present invention provides a method and apparatus based on the transient-grating effect on a transparent medium by using the SRSI technique. The method and apparatus of the present invention eliminate the drawbacks of the conventional methods. In the method of the present invention, the laser to be measured is divided into four beams by using a black plate with four equal-sized holes. The setup is simple, easy to adjust, the data acquisition and processing is fast, and it is a one-shot measurement that can be adapted to the real-time measurement. The method and apparatus of the present invention is useful for monitoring pulses with different pulse widths and different wavelength.

The present invention provides a method based on the transient-grating effect using the SRSI technique to measure the femtosecond pulse. The method comprises the following steps:

① the transient-grating effect (the laser to be measured is divided into four beams here) on a transparent medium is used to generate the reference light for an SRSI measurement;

② the spectral interference fringes D (ω, τ) between the generated transient-grating light and the light to be measured is measured by a high precision spectrometer;

③ Based on the spectral interference fringes D (ω, τ), the spectral phase is retrieved by the SRSI calculation technique. Then, we can get the pulse width and pulse shape.

The present invention provides a first apparatus for femtosecond laser pulse measurement based on the transient-grating effect as shown in FIG. 1, which is characterized in that it comprises a plate with four equal-sized holes (as shown in FIG. 4(a)), a delay plate, a plane reflective mirror, a first concave reflective mirror, a third-order nonlinear optical medium, an iris, a second concave reflective mirror, and a spectrometer with high spectral accuracy. The relationship of the components are shown as follows: the plate with the four equal-sized holes have four holes in a square shape; the first, second, and third quadrants of the plane reflective mirror are coated with high reflective film, and the fourth quadrant is uncoated; the femtosecond laser to be measured is divided into four beams after passing through the plate with four equal-sized holes. The four beams are referred to as the first, the second, the third, and the fourth beams. The first, the second, and the third beams are directly reflected by the first, the second, and the third quadrants of the plane mirror. The fourth beam passes through the delay plate, and then, is reflected by the uncoated fourth quadrant of the plane mirror. All the four beams are reflected onto the first concave mirror. A third-order nonlinear optical medium is located at the focal point of the first concave mirror. The first, the second, and the third beam are overlapped in the third-order nonlinear optical medium and generate a transient-grating signal light. The transient-grating light is collinearly overlapped with the fourth beam in space. After passing through the iris, the two beams are focused into the spectrometer with high spectral resolution by using the second concave reflection mirror. Thus, the interference spectrum is obtained for the SRSI measurement.

The plane mirror is a mirror of which the first, second, and third quadrants of the plane reflective mirror are coated with high reflective film, and the fourth quadrant is uncoated as shown in FIG. 4(b).

The present invention also provides a second apparatus for femtosecond laser pulse measurement based on the transient-grating effect as shown in FIG. 2, which is characterized in that it comprises a plate with four equal-sized holes (as shown in FIG. 4(a)), a delay plate, a lens, a plane reflective mirror, a third-order nonlinear optical medium, an iris, a concave reflective mirror, and a spectrometer with high spectral accuracy. The relationship of the components are shown as follows: the plate with four equal-sized holes have four holes in a square shape; the first, second, and third quadrants of the plane reflective mirror are coated with high reflective film, and the fourth quadrant is uncoated; the femtosecond laser to be measured is divided into four beams after passing through the plate with four equal-sized holes. The four beams are referred to as the first, the second, the third, and the fourth beams. The first, the second, and the third beams directly pass through the lens and then are reflected by the first, the second, and the third quadrants of the plane mirror. The fourth beam passes through the delay plate and the lens, and then is reflected by the uncoated fourth quadrant of the plane mirror. A third-order nonlinear optical medium is located at the focal plane of the lens. The first, the second, and the third beam are overlapped in the third-order nonlinear optical medium and generate a transient-grating signal light. The transient-grating light is collinearly overlapped with the fourth beam in space. After passing through the iris, the two beams are focused into the spectrometer with high spectral resolution by the concave reflection mirror. Thus, the interference spectrum is obtained for the SRSI measurement.

The present invention further provides a third apparatus for femtosecond laser pulse measurement based on the transient-grating effect as shown in FIG. 3, which is characterized in that it comprises a plate with four equal-sized holes (as shown in FIG. 4(a)), a delay plate, a first concave reflective mirror, a third-order nonlinear optical medium, an iris, a second concave reflective mirror and a spectrometer with high spectral accuracy. The relationship of the component parts are shown as follows: the first, second, and third quadrants of the first concave reflective mirror are coated with high reflective film, and the fourth quadrant is uncoated; the femtosecond laser to be measured is divided into four beams after passing through the plate with four equal-sized holes. The four beams are referred to as the first, the second, the third, and the fourth beams. The first, the second, and the third beams are directly reflected by the first, the second, and the third quadrants of the first concave reflective mirror. The fourth beam passes through the delay plate and then is reflected by the uncoated fourth quadrant of the first concave reflective mirror. A third-order nonlinear optical medium is located at the focal point of the first concave mirror. The first, the second, and the third beams are overlapped in the third-order nonlinear optical medium and generate a transient-grating signal light. The transient-grating light is collinearly overlapped with the fourth beam in space. After passing through the iris, the two beams are focused into the spectrometer with high spectral resolution by the second concave reflection mirror. Thus, the interference spectrum is obtained for the SRSI measurement.

The holes on the plate with four equal-sized holes may be of any shape. For example, the plate with the four equal-sized holes have the four holes in a square shape.

The present invention has the following features:

(a) The transient-grating effect (the laser to be measured is divided into four beams here) is used as the generation of the reference light in the measurement, where three of the four divided beams are used to generate the reference light. It may run in the spectral range of 200-3000 nm but the range is not so limited. Pulses with nanojoule level from the oscillator can also be measured with the method of the present invention.

(b) The apparatus according to the present invention is very simple. By using a few mirrors, two glass plates, the interference spectrum between the transient-grating signal and the pulse to be measured is obtained.

(c) In the present invention, the spectral interferometry is used to retrieve the spectral phase of the pulse. In the SRSI method, computer software programs may be used for the linear calculation, which is simple and fast. Only three-time iterative calculation is needed to obtain the spectral phase, pulse shape, and the temporal phase of the pulse.

(d) In comparison with the current technology, the present invention significantly extends the applicable range of the femtosecond pulse to be measured including the spectral range and pulse width. The measurement is fast and can be used as the single-shot measurement and for real-time monitoring.

BRIEF DESCRIPTION OF THE DRAWINGS

FIG. 6(a) shows the interference spectrum (thin-solid line) when the time delay between the laser pulse to be test and the reference light is 0.8 ps, the spectrum of the reference light (thick-solid line), and the spectrum of the laser pulse to be test (dotted line);

FIG. 6(b) shows the measured spectrum (solid line) and retrieved spectral phase (dotted line) of the pulse to be measured.

DETAILED DESCRIPTION OF THE INVENTION

Several embodiments of the present invention, together with the description are shown as follows, which serve to explain the principles of the invention. The drawings are only for the purpose of illustrate several embodiments of the invention and are not to be construed as limiting the invention.

The present invention uses a transient-grating light as a reference beam for the SRSI measurement. The transient-grating light is generated based on the transient-grating effect by using three beams overlapped on a transparent medium.

Figure 1:
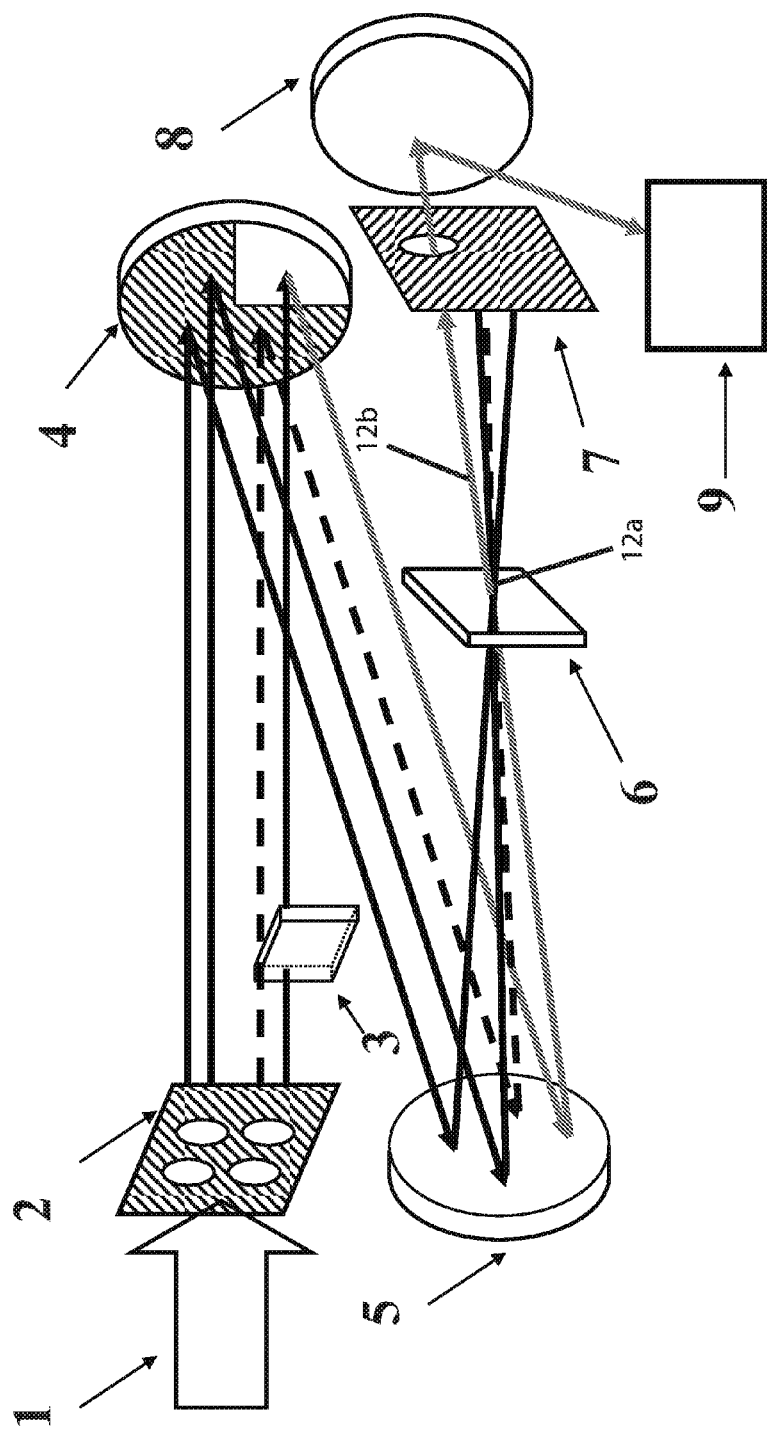
FIG. 1 shows one embodiment of the typical optical setup according to the present invention.
Figure 2:
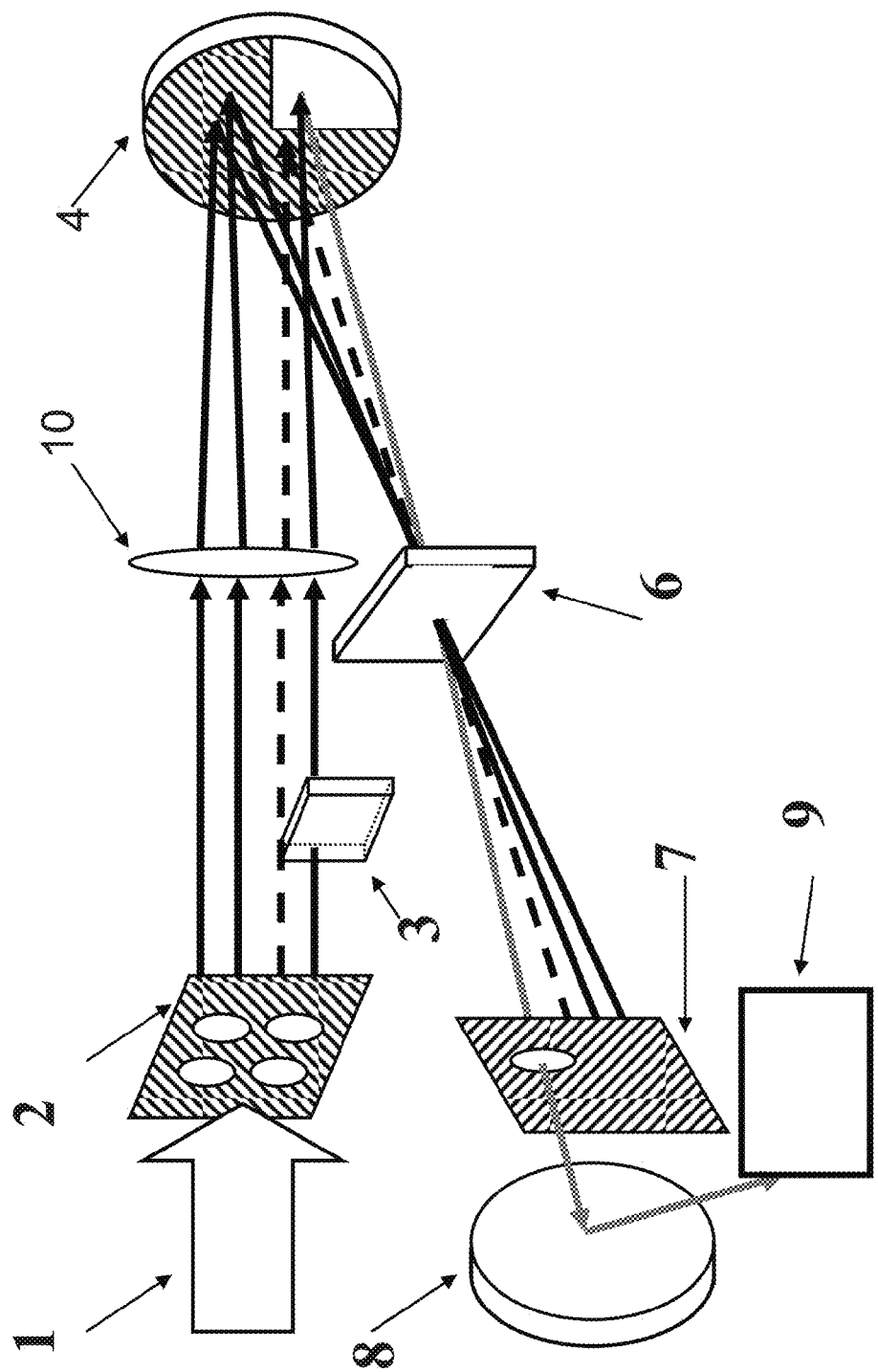
FIG. 2 shows another embodiment of the typical optical setup according to the present invention.
Figure 3:
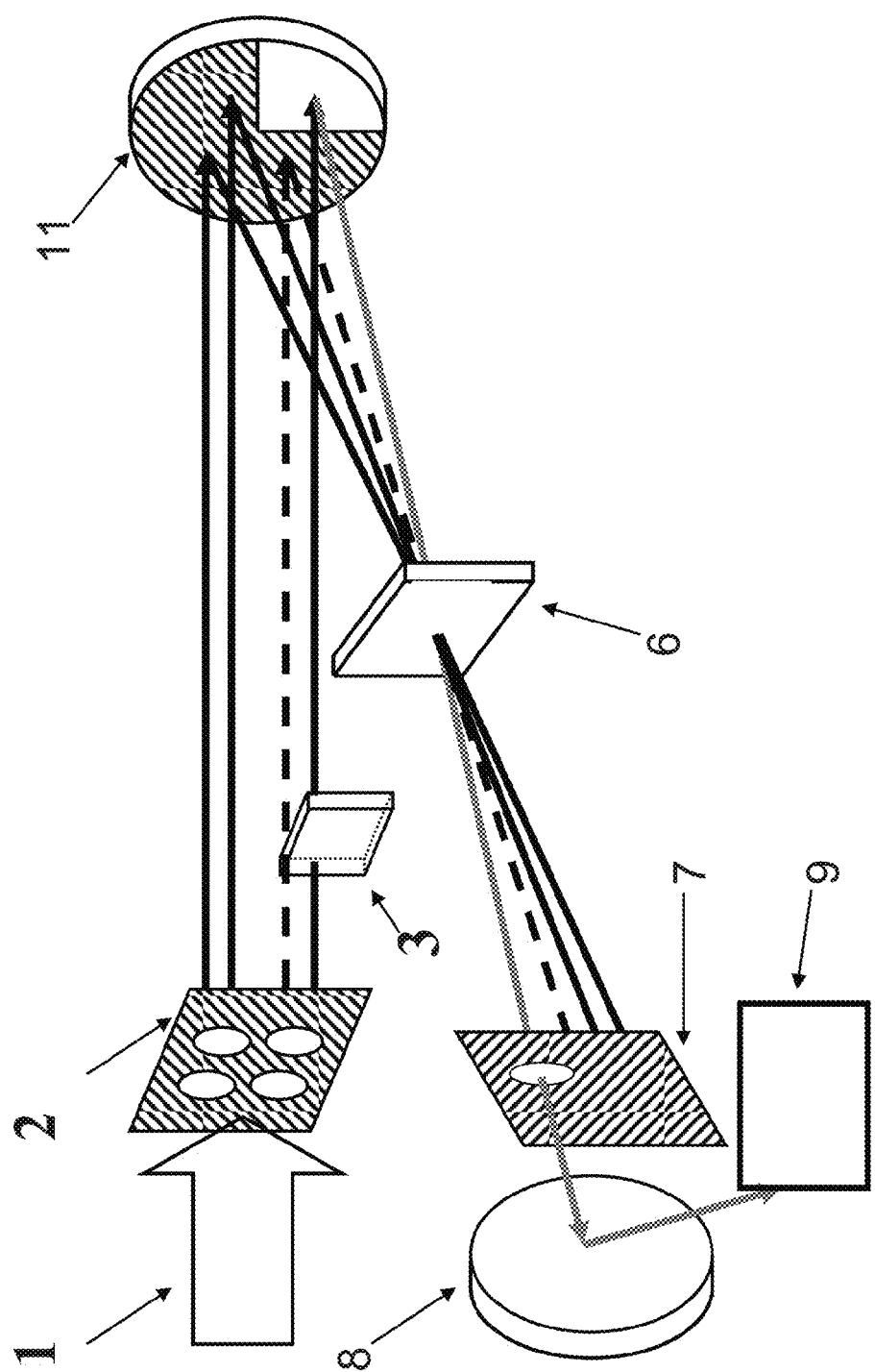
FIG. 3 shows yet another embodiment of the typical optical setup according to the present invention.

First, the transient-grating effect on a transparent dielectric material is used to generate a reference light. The first embodiment of the apparatus and optical setup of the present invention is shown in FIG. 1. The optical setup includes an incident laser beam 1; an iris plate 2; a glass plate 3 which is used to introduce a suitable time delay; a plane reflective mirror 4, of which the first, second, and third quadrants of the plane reflective mirror 4 are coated with high reflective film for light tuning; a first concave mirror coated with high reflective film 5; a transparent medium 6 for generation of the transient-grating light; an iris 7 which is used to select the signal light and block stray light; a second concave mirror with a reflective film 8; a spectrometer with high spectral resolution 9 for the measurement of the spectrum and the spectral interferometry.

Figure 4:
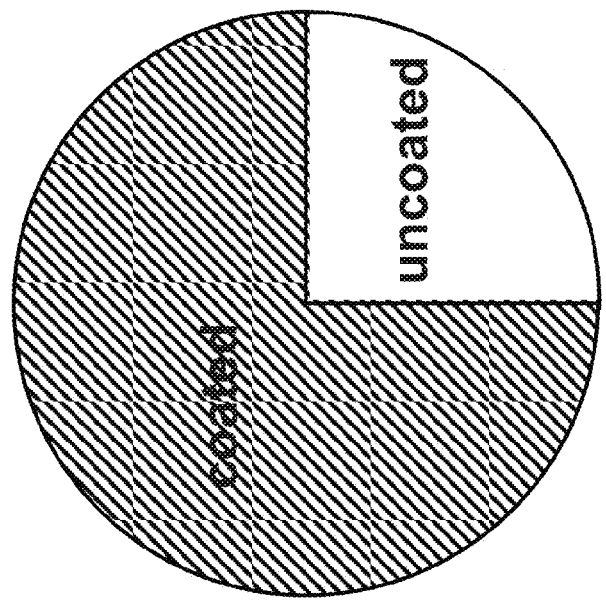
FIG. 4(a) is a schematic view of the plate with four equal-sized holes used in the present invention, with the light is shown to be passing through the white part of the plate. L is the distance between the center of the two neighbor holes and d is the diameter of the white hole.
FIG. 4(b) is a schematic view of the plane reflective mirror that the first, second, and third quadrants of the mirror are coated with high reflective film, and the fourth quadrant is uncoated; the white area is uncoated, the shaded area is coated.
Figure 4:
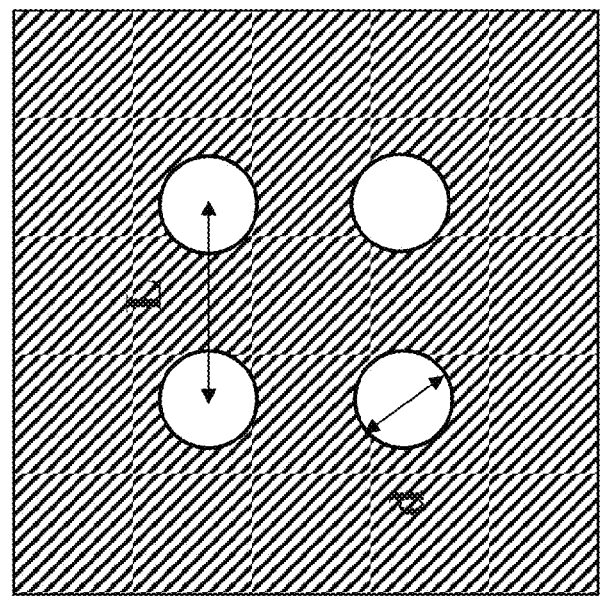

In the optical setup in FIG. 1, plate 2 has four holes with equal-diameter which are arranged in a square shape. The incident laser is divided into four beams with equal diameter by the plate 2 as shown in FIG. 4(a). The plane reflective mirror 4 is shown in FIG. 4(b), of which the first, second, and third quadrant are coated, and the fourth quadrant is not coated.

In FIG. 1, beam 1 is large enough (for example, larger than 5 mm) to cover the plate 2. After passing though the plate 2, beam 1 is divided into four beams with equal beam diameter. The four laser beams located on the four corners of a square, formed a so-called "box shape" (box).

One of the four beams passes though a glass plate 3 with suitable thickness. The other three laser beams of the four beams propagate in the free air. Then, there is suitable time delay between the beam that passes through the glass plate 3 and the other three beams. Then, the four beams are reflected by the plane reflective mirror 4. The beam that is time delayed is reflected by the non-coated quadrant of mirror 4. The other three beams are reflected by the three coated quadrants of mirror 4, respectively.

After reflecting by mirror 4, the four beams are reflected onto the first concave reflective mirror 5 with a small incident angle. Then, the four beams are focused onto the glass medium 6 after mirror 5. The three beams reflected by the coated parts are overlapped on the dielectric glass 6 both in time and space. The transient-grating signal light 12a is generated, which is on the direction of the time delayed beam 12b and is overlapped with it in space. By using the iris 7, the transient-grating signal light 12a and the beam to be measured (the beam with suitable time delay) 12b are selected. After focusing by using a second concave reflective mirror 8, the spectral interferometry is measured by the spectrometer 9 with high spectral resolution.

In the device of the present invention, the diameter and distance of the four holes on the plate 2 are chosen by the incident beam. The design is based on the principles that the four beams will not affect each other. The glass plate 3 is selected according to the laser wavelength which should be transparent for the glass and the dispersion is small. The thickness of the glass plate 3 should be thin if the spectral bandwidth is broad and the pulse duration is short. It will be limited by the spectral resolution of the spectrometer 9. Based on the wavelength of the incident pulse, the plane reflective mirror 4 and the first concave reflective mirror 5 can be coated with silver, gold, aluminum, or a high reflective dielectric film. The glass medium 6 is transparent to the incident laser pulse, and preferably, has a relatively high third-order nonlinear coefficient. The thickness of glass plate 6 is usually selected to be 100-500 um. Preferably, the spectrometer 9 has a high spectral resolution.

In principle, the transient-grating effect is described by the expression (1):

$$I_{TG}(\omega_{TG}) \propto \left| \int\int d\omega_1 d\omega_2 \chi^{(3)} \tilde{E}_1^*(z,\omega_1) \tilde{E}_2(z,\omega_2) \tilde{E}_3(z,\omega_{TG}-\omega_2+\omega_1) \mathrm{sinc}(\Delta k_z(\omega_{TG},\omega_1,\omega_2)L/2) \right|^2 \quad (1)$$

where $\omega_{TG}$, $\omega_1$ and $\omega_2$ are the transient-grating light, two incident lights, respectively. $\Delta k_z(\omega_{TG}, \omega_1, \omega_2)$ is the phase mismatch, L is thickness of the nonlinear dielectric material.

According to the expression (1), the generated transient-grating light own a smoother and wider spectrum than that of the incident laser pulse. As a result, the generated transient-grating light is used as the reference pulse for the SRSI measurement.

In the SRSI measurement, the generated transient-grating light (named reference light hereafter) together with the time delayed pulse to be measured are focused into a spectrometer with high spectral resolution.

The laser pulse to be measured is blocked at first to measure the spectrum of the reference light. Then, the other three beams is shielded so that no reference light is generated. The spectrum of the laser pulse to be measured is obtained by the spectrometer. By adjusting the pulse energy of the incident laser, the ratio between the reference light and the pulse to be measured is adjusted to suitable value (for example, the reference light is about 3 times stronger than the that of the pulse to be measured). Then, the spectral interference is measured and the data is saved.

By changing the thickness of the glass plate 3, the time delay between the reference light and the pulse to be measured can be tuned. Clear interference fringes can appear at suitable time delay τ. The interference fringes increase with the increase of the time delay. It can increase the accuracy of the measurement of the spectrum and spectral phase, but it also requires a spectrometer with a higher spectral resolution. In the example, the time delay τ is adjusted to make the spectral fringes interval width at about 2 nm. The two laser beams are optimized to get the maximum modulation depth spectral interference fringes $D(\omega,\tau)$ and save the data. The measured spectral interference fringes $D(\omega,\tau)$ can be expressed as:

$$D(\omega, \tau) = |E_{ref}(\omega) + E(\omega)e^{i\omega\tau}|^2 \quad (2)$$
$$= |E_{ref}(\omega)|^2 + |E(\omega)|^2 + f(\omega)e^{i\omega\tau} + f^*(\omega)e^{-i\omega\tau}$$

where ω is the angular frequency of the laser, $S_0(\omega)=|E_{ref}(\omega)|^2+|E(\omega)|^2$ is the sum spectrum of the reference pulse and the pulse to be measured; $f(\omega)=E^*_{ref}(\omega)E(\omega)$ is the interference term of the two laser beams.

Subsequently, the spectrum and spectral phase of the pulse to be measured can be retrieved by using the SRSI method, and then obtain the pulse width and shape.

Figure 5:
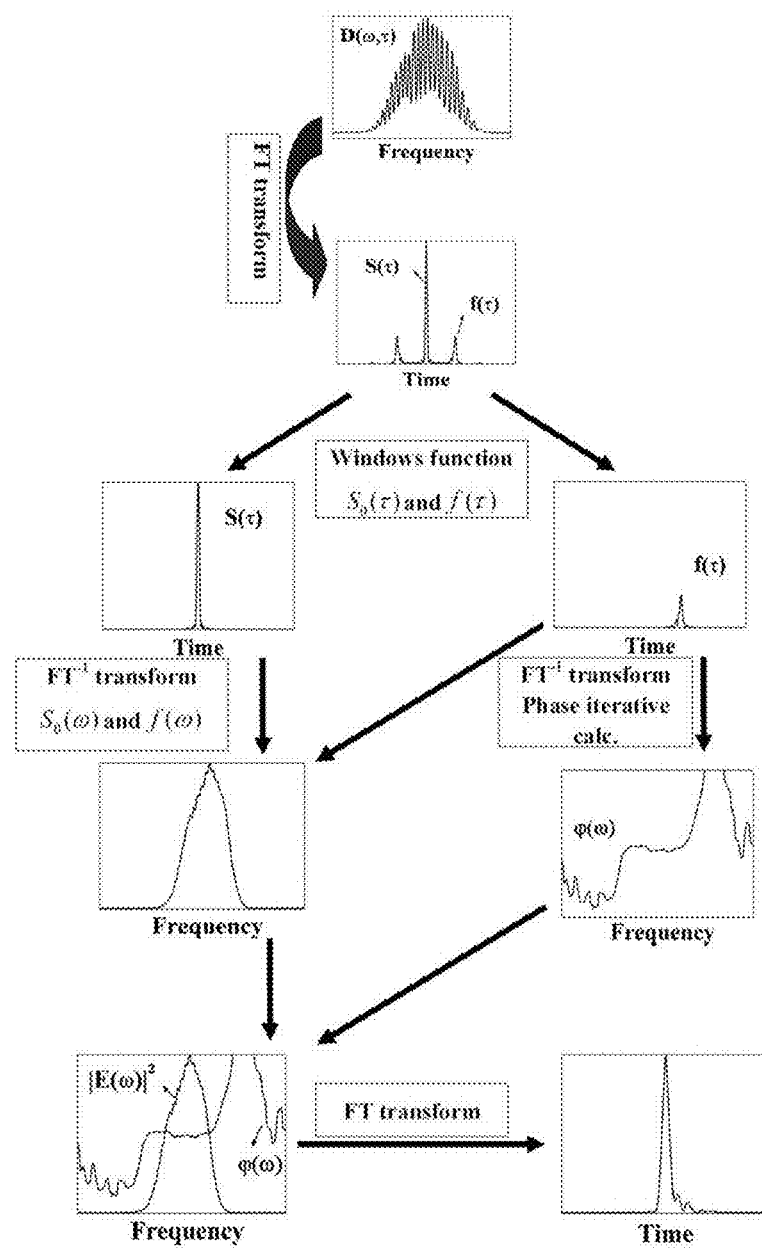
FIG. 5 shows the phase retrieval processes of the SRSI method for the present invention.

The calculation process of the SRSI method is shown as follows:

The initial spectral phase is set to 0, the spectrum and spectral phase of the pulse to be measured may be calculated by using Fourier transformation and iterative procedure shown in FIG. 5, where $S_0(\tau)$, $f(\tau)$ are the Fourier transformation of the $S_0(\omega)$ and $f(\omega)$ in the time domain, respectively. To obtain the laser spectrum and spectral phase, it needs the following steps as shown in FIG. 5:

1. Fourier transform the measured interference spectrum $D(\omega,\tau)$ into the time-domain signal;
2. Extracted the time domain signals $S_0(\tau)$, $f(\tau)$ out by using a window function (such as super-Gaussian function);
3. Inverse Fourier transform $S_0(\tau)$ and $f(\tau)$ to the frequency domain, and obtain $S_0(\omega)$ and $f(\omega)$, respectively;
4. By using the following linear formulas together with $S_0(\omega)$ and $f(\omega)$, we can obtain the spectral amplitudes of both the pulse to be measured and the reference light, which are $|E(\omega)|$ and $|E_{ref}(\omega)|$, respectively:

$$|E_{ref}(\omega)|=\frac{1}{2} \cdot (\sqrt{(S_0(\omega)+2|f(\omega)|)}+\sqrt{(S_0(\omega)-2|f(\omega)|)}) \quad (3)$$

And $$|E(\omega)|=\frac{1}{2} \cdot (\sqrt{(S_0(\omega)+2|f(\omega)|)}-\sqrt{(S_0(\omega)-2|f(\omega)|)}) \quad (4)$$

As a result, we can obtain the laser spectra of the pulse to be measured and reference pulse, which are $|E(\omega)|^2$ and $|E_{ref}(\omega)|^2$, respectively.

5. After unwrapping the $f(\omega)$, the spectral phase of the pulse to be measured can be calculated iteratively by using the following formula:

$$\phi(\omega)=\phi_{ref}(\omega)+\arg f(\omega)+C \quad (5)$$

where, $\phi(\omega)$ and $\phi_{ref}(\omega)$ are the spectral phases of the pulse to be measured and that of the reference light (initial phase is assumed to be 0), C is the phase constant induced by the dispersive optical elements;

6. The obtained laser spectrum and spectral phase are Fourier transformed to time domain. Then, the pulse shape $|E(t)|^2$ and the pulse width of the pulse to be measured are obtained, while E(t) is the Fourier transform value of $E(\omega)$;

7. Because the spectral phase of the reference light is not exactly equal to zero, it needs a further iterative calculation step to obtain optimized laser spectrum and spectral phase. The iterative calculations are shown as follows:

(i) Based on the result obtained in the step 6, the shape of the electric field of the reference light can be expressed as $E(t)*|E(t)|^2$ according to the formula (1). Through Inverse Fourier transformation of $E(t)*|E(t)|^2$, the spectrum and spectral phase of the reference light are obtained, which are $|E_{ref}(\omega)|^2$ and $\phi_{ref}(\omega)$, respectively.

(ii) Based on the spectral phase of the reference light $\phi_{ref}(\omega)$ obtained in the above step (i) and the formula $\phi(\omega)=\phi_{ref}(\omega)+\arg f(\omega)+C$, an optimized spectral phase of the pulse to be measured can be obtained. After Fourier transformation of the new spectrum and new spectral phase of the pulse to be measured, the pulse shape and pulse width of the pulse to be measured are obtained;

(iii) After repeating above steps (i) and (ii) by several times, the optimized spectrum and spectral phase of the pulse to be measured are obtained. Finally, the corrected laser spectrum, pulse shape, and pulse duration of the pulse to be measured are obtained.

EXAMPLE

An apparatus that uses the optical setup of FIG. 1 is used, a femtosecond pulse from a commercial laser system (Coherent Inc.) is measured. The incident laser 1 to be measured have a repetition rate of 1kHz, a center wavelength of 800nm, a beam diameter of 15 mm, and a pulse energy of 10 μJ. The incident beam 1 is divided into four beams after passing through the plate 2. The beam on the right-lower corner of the four beams passes though a glass plate 3 with 0.5 mm thickness. The other three laser beams of the four beams propagate in the free air. Then, the four beams are reflected by the plane reflective mirror 4. The beam that passes through the 0.5 mm thickness glass plate is reflected by the non-coated quadrant of mirror 4. The other three beams are reflected by the coated first, second, and third quadrants of mirror 4, respectively. After being reflected by mirror 4, the four beams are reflected onto the first concave reflective mirror 5 with a radius of 600 mm. Then, the four beams are focused onto a $CaF_2$ plate 6 with 150 μm thickness. The three beams reflected by the coated parts are overlapped on the $CaF_2$ both in time and space. The transient-grating signal light 12a is generated, which is on the direction of the time delayed beam 12b and is overlapped with it in space. By using an iris 7, the transient-grating signal light 12a and the beam to be measured 12b (the beam with suitable time delay) are selected. After focusing by using a second concave reflective mirror 8, the spectral interferometry is measured by the spectrometer 9 with high spectral resolution.

Figure 6A:
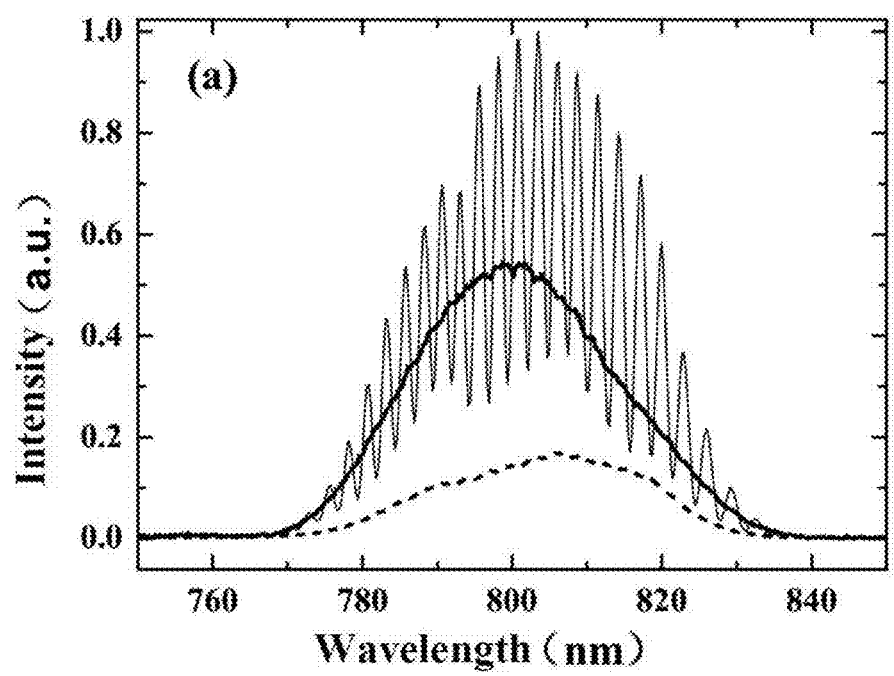
FIGS. 6(a) and 6(b) show the data measured based on the setup of the optical devices in FIG. 1, where the pulse used has the center wavelength of 800 nm and pulse duration of 40 fs.
Figure 6B:
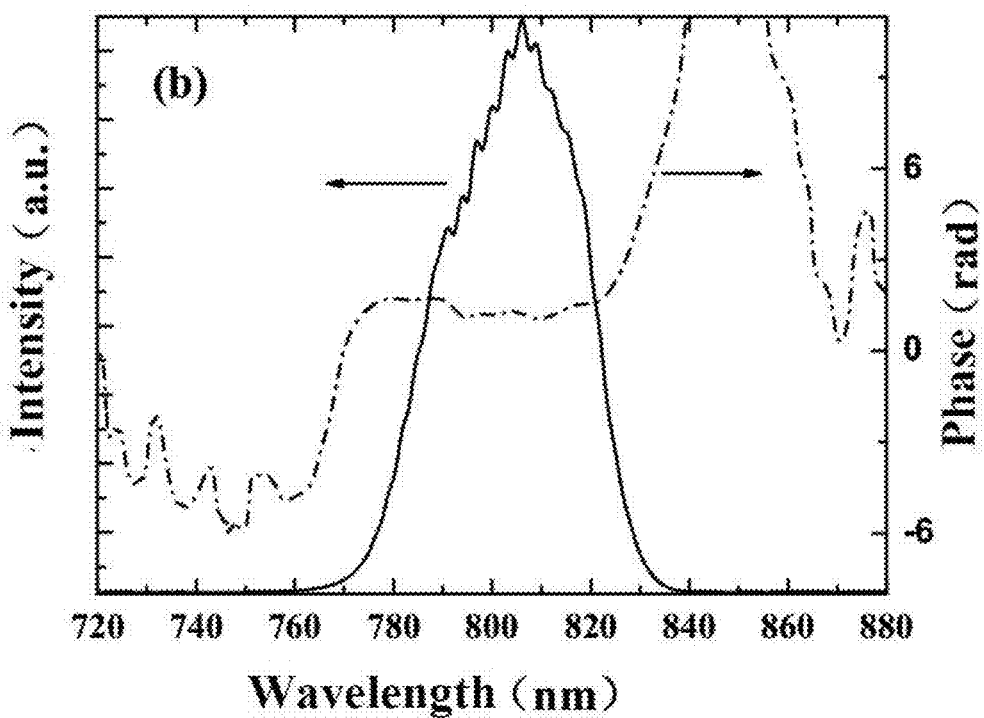

FIG. 6(a) shows the interference spectrum (thin-solid line) when the time delay between the laser pulse to be test and the reference light is 0.8 ps, the spectrum of the reference light (thick-solid line), and the spectrum of the laser pulse to be test (dotted line). Based on the measured interference spectrum, the spectrum and spectral phase of the pulse to be measured are obtained by using the calculation process shown in FIG. 5. FIG. 6(b) shows the measured spectrum (solid line) and retrieved spectral phase (dotted line) of the pulse to be measured.

As a result of using the method of the present invention, the pulse width and shape are obtained. In the method of the present invention, only two or three reflective mirrors are used. The setup is very simple and does not need polarizer that will induce dispersion to the measured pulse. As a result, the method can be used to measure ultrashort pulse in the range of 10-300 fs at different wavelength. It can also be run in single-shot or be used for real-time monitoring of femtosecond laser pulse. Then, the spectral phase measured can be fed back to phase compensative device and optimize the femtosecond laser pulse.

We claim:

1. An apparatus for measuring femtosecond laser pulse, comprising
    a plate having four equal-sized holes and being positioned on an optical pathway to receive an incoming laser to be measured,
    a plane reflective mirror being positioned on the optical pathway behind the plate and having a first, a second, a third, and a fourth quadrants,
    a delay plate being positioned on the optical pathway behind one of the four equal-sized holes of the plate and between the hole and the fourth quadrant of the plane reflective mirror,
    a first concave reflective mirror being positioned on an optical pathway of reflected beams by the plane reflective mirror and having a focal point,
    a third-order nonlinear optical medium being positioned on the focal point of the first concave reflective mirror,
    an iris being positioned on an optical pathway of beams after passing through the third-order nonlinear optical medium,
    a second concave reflective mirror being positioned behind the iris on the optical pathway of beams, and
    a spectrometer with high spectral resolution being positioned to received beams after being focused by the second concave reflective mirror,
    wherein the plate receives the incoming laser and divides the laser into a first, second, third, and fourth beams through the four equal-sized holes;
    the first, second, and third quadrants of the plane reflective mirror directly reflect the first, second, and third beams, respectively;
    the delay plate is positioned to have the fourth beam passing therethrough, and the fourth beam is then reflected by the fourth quadrant of the plane reflective mirror;
    the first concave mirror is positioned to reflect the first, second, third, and fourth beams;
    the third-order nonlinear optical medium is positioned where the first, second, and third beams are overlapped therein to generate a transient-grating signal light that collinearly overlaps with the fourth beam in space;
    the iris is positioned to have the transient-grating signal light and the fourth beam passing through;
    the second concave reflective mirror is positioned behind the iris and focuses the transient-grating signal light and the fourth beam into the spectrometer,
    the spectrometer is positioned to receive the transient-grating signal light and the fourth beam after being focused by the second concave reflective mirror, whereby an interference spectrum is obtained for SRSI measurement.

2. The apparatus for measuring femtosecond laser pulse according to claim 1, wherein the first, second, and third quadrants of the plane reflective mirror are coated with high reflective film, and the fourth quadrant of the plane reflective mirror is uncoated.

3. The apparatus for measuring femtosecond laser pulse according to claim 1, wherein each of the four equal-sized holes of the plate is of a square shape.

4. The apparatus for measuring femtosecond laser pulse according to claim 1, wherein the delay plate is a neutral density filter.

* * * * *